(12) United States Patent
Hauser

(10) Patent No.: US 6,886,550 B2
(45) Date of Patent: May 3, 2005

(54) WIRE SAW WITH MEANS FOR PRODUCING A RELATIVE RECIPROCATING MOTION BETWEEN THE WORKPIECE TO BE SAWN AND THE WIRE

(75) Inventor: Charles Hauser, Genolier (CH)

(73) Assignee: HCT Shaping Systems SA, Cheseaux (CH)

( * ) Notice: Subject to any disclaimer, the term of this patent is extended or adjusted under 35 U.S.C. 154(b) by 8 days.

(21) Appl. No.: 10/311,599

(22) PCT Filed: Sep. 7, 2001

(86) PCT No.: PCT/IB01/01624

§ 371 (c)(1),
(2), (4) Date: Dec. 18, 2002

(87) PCT Pub. No.: WO02/26431

PCT Pub. Date: Apr. 4, 2002

(65) Prior Publication Data

US 2003/0145707 A1 Aug. 7, 2003

(30) Foreign Application Priority Data

Sep. 28, 2000 (CH) .............................. 1896/00

(51) Int. Cl.$^7$ ............................. B28D 1/008; B26D 1/46
(52) U.S. Cl. ...................... 125/21; 83/651.1; 125/16.01
(58) Field of Search ........................... 125/16.02, 16.01, 125/21; 83/651.1

(56) References Cited

U.S. PATENT DOCUMENTS

| | | | |
|---|---|---|---|
| 5,052,366 A | | 10/1991 | Matsukura |
| 5,735,258 A | * | 4/1998 | Okuno et al. ............. 125/16.02 |
| 5,842,462 A | | 12/1998 | Schmid et al. |
| 5,913,305 A | * | 6/1999 | Hauser .................... 125/16.02 |
| 6,145,422 A | * | 11/2000 | Katamachi et al. ........... 125/21 |
| 6,295,977 B1 | * | 10/2001 | Ripper et al. ............. 125/16.02 |
| 6,371,101 B1 | * | 4/2002 | Hauser .................... 125/16.01 |

FOREIGN PATENT DOCUMENTS

EP          0 953 416 A    11/1999

* cited by examiner

*Primary Examiner*—Hadi Shakeri
(74) *Attorney, Agent, or Firm*—Young & Thompson (57) ABSTRACT

A sawing device includes a wire assembly (15) supported on wire-guiding rolls (11, 12) and pressed against a workpiece to be sawn (20) fixed on a support table (21). An oscillating device (23) produces a relative reciprocating movement between the workpiece and the wire assembly (15) around an oscillation axis (A) whereof the spatial position can be adjusted and programmed so that the oscillation axis (A) is at a programmable and adjustable distance from an effective axis of rotation (28) of the oscillating device (23).

8 Claims, 9 Drawing Sheets

WIRE SAW WITH MEANS FOR PRODUCING A RELATIVE RECIPROCATING MOTION BETWEEN THE WORKPIECE TO BE SAWN AND THE WIRE

BACKGROUND OF THE INVENTION

The present invention relates to a wire sawing device comprising at least one layer of wires adapted to move with alternate or continuous movement, this layer of wires being pressed against a piece to be sawed and supported by wire guide cylinders, first means being provided to carry out a relative advancing movement between the piece to be sawed and the layer of wires in a cutting direction contained in a cutting plane, second means being provided to carry out a relative oscillating movement between the piece to be sawed and the layer of filaments about an axis of oscillation perpendicular to the cutting plane.

In this type of device, the filament is wound spirally about wire guide cylinders and forms between two wire guide cylinders at least one layer of parallel wires whose distance between successive wires fixes the thickness of the slices. Moreover, the plane of the layer or layers of wires forms, in known devices, a fixed angle generally perpendicular to the direction of sawing, which can give rise to undulations and striations on the surface of the slices in the case of generally lateral movement of the layer of wires resulting from thermal oscillations for example. These undulations, even though several micrometers in amplitude, suffice to render unusable the slices for certain applications such as silicon for the semiconductor industry. Moreover, during use of the back and forth movements, a roughness due to the reversal of direction arises. The tendency of the users of slices is to specify that these have a rough sawed surface as perfect as possible so as to reduce the subsequent operations of lapping or correction and polishing. Moreover, during the use of free abrasive, the abrasive picked up by the wire will become worn along the length of the sawing path and hence will modify the width of the sawed line. This wear will as a result give rise to a variation in the thickness of the slices. The sawing results as well as the tolerances obtained will depend on the penetration of the abrasive between the wire and the piece to be sawed as well as its wear along the sawing path. This wear of the abrasive will depend on the type of abrasive and on the length of the sawed or engaged length, which is to say the dimension of the ingots. This dimension being constantly increasing because of the progress of the technology of crystal growth, the phenomenon has a tendency to accentuate itself. It will also depend on the quantity of material removed per unit length and per unit time. During cutting of the pieces of non-rectangular or square shape, the length sawed by the layer of filaments or length engaged, varies as a function of the sawing depth. The penetration of the abrasive, and hence the wear of the abrasive, will thus vary as a function of the sawed height, giving rise in the shape of the piece to a variation of thickness which is a function of the height. This variation of thickness can be sufficiently great that the tolerances given by the user will be exceeded.

DESCRIPTION OF THE RELATED ART

Wire sawing devices of the mentioned type with oscillation of the layer of wires or of the piece to be sawed are already known, particularly in the industry of electronic components, of ferrites, of quartz and silica, to obtain thinned slices of material such as poly or monocristallin silicon or other materials, such as GaAs, InP, GGG or also quartz, synthetic sapphire, namely ceramics. The high price of these materials renders wire sawing more attractive in comparison to other techniques such as diamond disc sawing.

Figure 11:
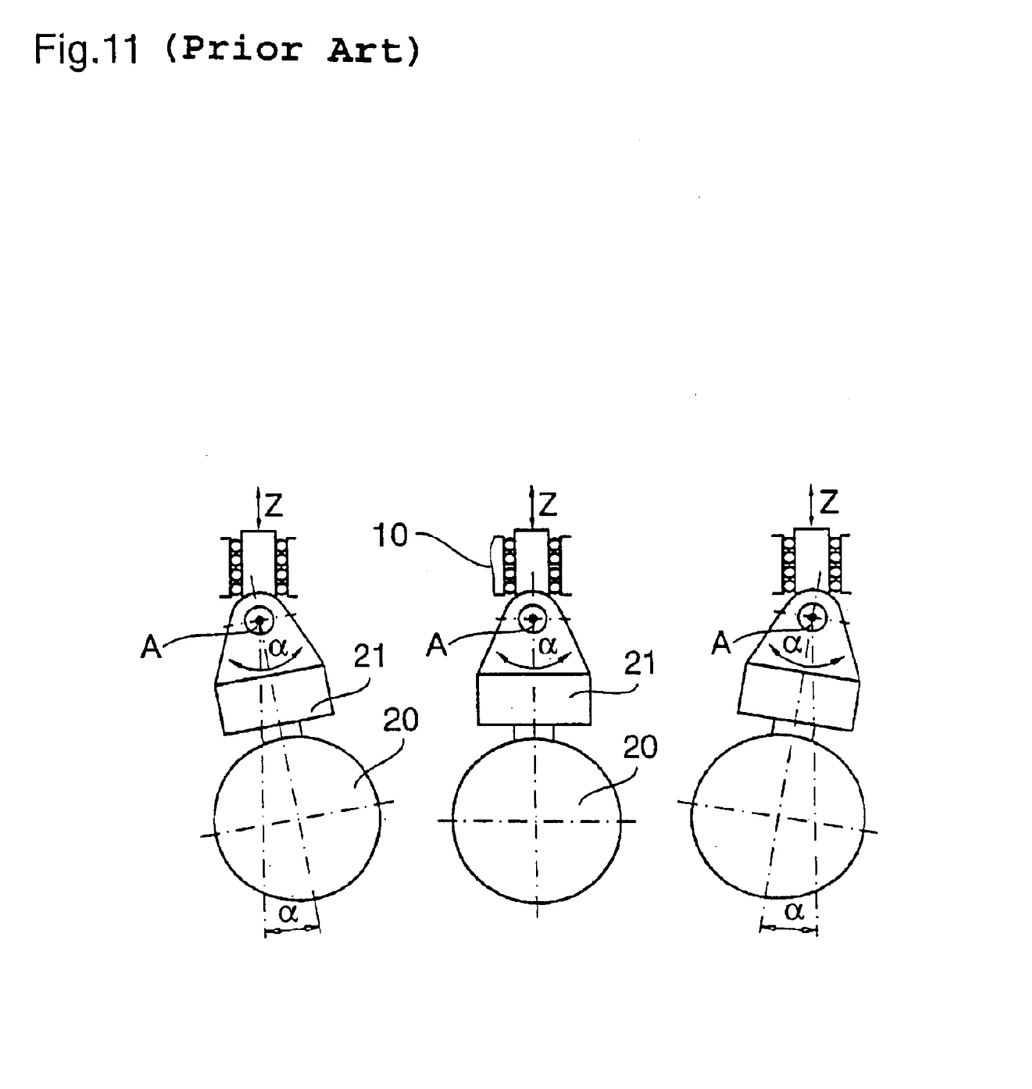
FIG. 11 shows partially a known sawing device with oscillatory movement.

Certain of the known devices for example that illustrated in FIG. 11, impart an oscillatory movement to the piece to be sawed.

This oscillatory movement is however always about a fixed axis of rotation A whose position is predetermined once for all by the mechanical construction of the sawing device. This position accordingly cannot if desired be varied and modified. Thus this fixed position of oscillation does not permit avoiding undulations and striations in the obtained slices. Moreover, it can even produce other irregularities during cutting due to an oscillation with inadequate positioning.

SUMMARY OF THE INVENTION

The present invention has for its object to overcome the mentioned drawbacks, and it is characterized to this end by the fact that the second means comprise an oscillation device comprising at least one effective axis of rotation and movable members arranged so as to produce a relative movement of oscillation between the piece to be sawed and the layer of wires about an axis of oscillation whose spatial position can be adjusted and programmed such that this axis of oscillation is located at a programmable and adjustable distance from said effective axis of rotation.

Thus the relative positions of the wire layer and the axis of oscillation can be adjusted and varied according to applications. The precision of the slices and sawed pieces is thus greatly improved. The surface condition of the obtained slices is very regular, given that a movement of oscillation with a precisely positioned axis permits obtaining a polishing and lapping effect during sawing. All undulation and roughness can be avoided by superposition in the course of sawing of a lapping and rectification operation arising from oscillations of the piece to be sawed about an axis whose position can be adjusted and programmed in an optimal manner. Moreover, this particular oscillation permits better control of the penetration of the abrasive along the sawing path and clearing effect of the wire thereby improving its sawing efficiency.

In an advantageous embodiment, the sawing device comprises a support table on which the piece to be sawed is fixed, and the oscillation device is arranged so as to act on this support table.

Alternatively, the oscillation device is arranged so as to act on the mechanical members supporting the wire guide cylinders.

According to a preferred embodiment, the oscillation devices comprises first members to carry out a rotation about an axis of a rotation perpendicular to the cutting plane, second members to carry out a movement in a direction parallel to the cutting plane, and third members to carry out a movement of translation in a direction coinciding with the cutting direction.

These characteristics ensure a particularly reliable construction whilst ensuring very high quality of the sawed products.

According to another embodiment, the oscillation device comprises two rotatable members to carry out rotations about two axes of rotation perpendicular to the cutting plane, and translation members to carry out a movement of translation in a direction coinciding with the cutting direction.

Again, according to a supplemental embodiment, the oscillation device comprises three rotatable members to carry out rotations about three axes of rotation perpendicular to the cutting plane.

Another desirable embodiment is characterized by the fact that the oscillation device comprises a pendulum pivotally mounted about an axis of rotation perpendicular to the cutting plane, wire guide cylinders being mounted on at least one support that can be moved on this pendulum in a direction parallel to the cutting plane, translation members being provided to produce relative movement between the piece to be sawed and said axis of rotation in a direction coinciding with the cutting direction.

Desirably, the cutting device comprises a programmable control unit adapted to control the movements of rotation and translation produced by the oscillation device such that the combination of these generated movements results in an, oscillatory movement about an axis of oscillation whose position is adapted to be programmed.

The control unit can thus be arranged so as to produce a movement of oscillation which can have variable amplitudes and frequencies with time and/or as a function of the sawing depth.

BRIEF DESCRIPTION OF THE DRAWINGS

Other advantages will appear from the characteristics set forth in the dependent claims and from the explanatory description hereafter of the invention, in greater detail, with the help of drawings which show schematically and by way of example two embodiments and modifications.

DESCRIPTION OF THE PREFERRED EMBODIMENTS

Figure 1:
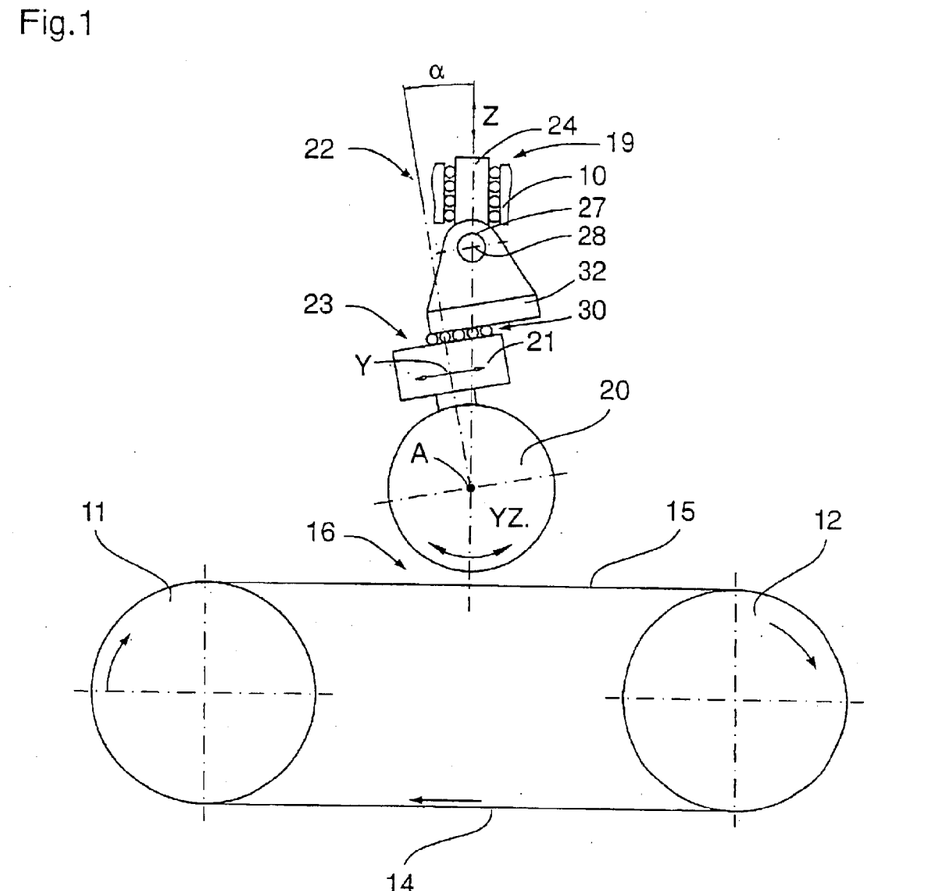
FIG. 1 is a side schematic view of a first embodiment.
Figure 2:
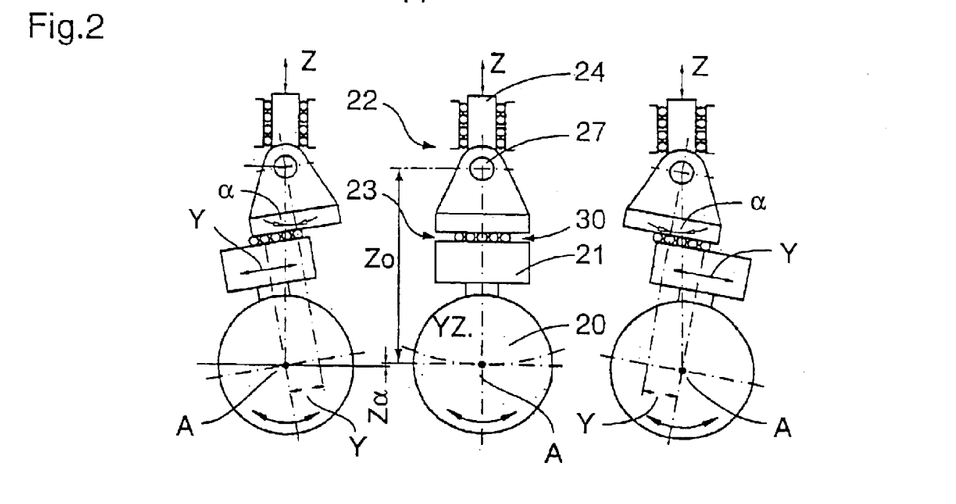
FIG. 2 shows partially this first embodiment in three different positions.
Figure 3:
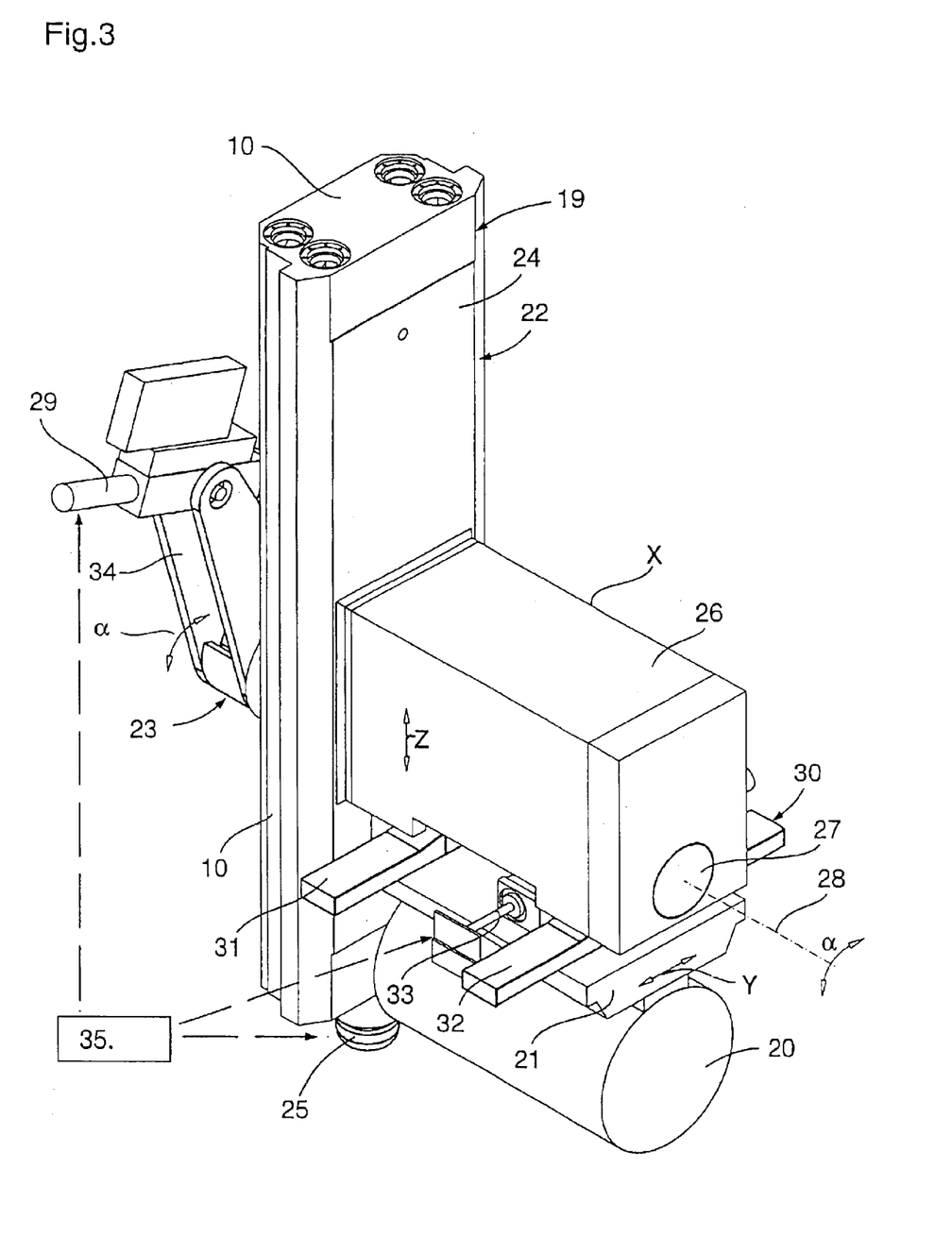
FIG. 3 is a perspective view of a mechanical embodiment of the first embodiment.

The wire sawing device or machine shown in FIGS. 1 to 3 constitutes a first embodiment. This device comprises a frame 10 supporting at least two wire guide cylinders 11, 12 on which a wire is wound spirally to form at least one layer of wires 15 whose distance between two adjacent wires fixes the thickness of the sawed slices. The wire guide cylinders 11, 12 are for this purpose generally clad with a layer of synthetic material engraved with throats defining the interval between adjacent wires of the layer. The wire is either covered with a fixed abrasive or supplied continuously with a loose abrasive, generally in suspension in a liquid. The wire thus serves to carry the abrasive particles which themselves perform the sawing work in a so-called sawing zone 16. This wire is desirably constituted of spring steel with a diameter comprised between 0.1 and 0.2 mm so as to saw the blocks of hard material or of more particular composition such as silicon, ceramic, compounds of elements of groups III–V, GGG (Gadolinium Gallium Garnet), sapphire, etc., into layers of about 0.5 to 5 mm thickness. The abrasive agent is a commercial product and can be diamond, silicon carbide, alumina, etc., in a form fixed to the wire or in a loose form in a slip.

The piece 20 to be sawed is fixed on a support table 21 and this latter is movably mounted on the frame 10 by a control device 22 for the movements of the piece 20 to be sawed relative to the layer of wires. This control device 22 includes on the one hand an advancing device 19 to carry out a relative advancing movement between the piece 20 to be sawed and the layer of wires 15 in a cutting direction Z contained in the cutting plane YZ which is perpendicular to the axes of the wire guide cylinders 11, 12, and on the other hand an oscillation device 23 arranged so as to cause an oscillatory movement of the piece 20 to be sawed, such that the position of the axis of oscillation A of this oscillatory movement can be adjusted and predetermined.

This control device 22 comprises for this purpose a slide 24 mounted movably on the frame 10 in the cutting direction Z and driven by a motor 25. This slide 24 also corresponds to said advancing device 19 and it is secured to a perpendicular arm 26 disposed in an X direction perpendicular to the Z direction and to the cutting plane YZ.

A shaft 27 whose principal axis 28 is parallel to X is pivotally mounted on the slide 24 and the arm 26. This shaft 27 is actuated by a power driven jack 29 by means of two levers 34 and can turn about an angle α about the axis 28 with adjustable frequency and amplitude.

The support table 21 is mounted on the shaft 27 by means of a translation mechanism 30. This latter comprises two rails 31, 32 secured to the shaft 27 on which the support table 21 is slidably mounted in a direction Y. This movement in the direction Y is controlled by an actuator 33. The motor 25, the jack 29 and the actuator 33 are controlled by a programmable electronic control unit 35, such as a computer.

Thus, the oscillatory movement obtained by the control device 22 and the oscillation device 23 can be decomposed into two translatory movements in the directions Y and Z and a rotation through an angle α about the axis 28 perpendicular to said directions Y and Z and forming the cutting plane YZ which contains the cutting direction Z and which is parallel to the wires of the layer of wires 15 and perpendicular to the plane of the layer of wires 15.

For rotation by an angle α about the axis of rotation 28 and oscillation through the same angle α about an axis of oscillation A whose spatial position can be programmed such that this axis of oscillation A is located at a predetermined distance $Z_0$ from the axis of rotation 28, there are for the device shown in FIGS. 1 to 3 the following movements:

$$Z_\alpha = \left(\frac{Z_0(1-\cos a)}{\cos a}\right)$$

$$Y_\alpha = Z_0 \cdot tg\alpha$$

Wherein $Z_0$ is equal to the distance separating the axis of rotation 28 and the point or axis of oscillation A;

$Z_\alpha$ corresponds to the movement of the slide 24 relative to the frame 10 in the direction Z from an aligned medial position in which the angle α is zero; and $Y_\alpha$ corresponds to the movement of the support table 21 relative to the rails 31, 32 and to the shaft 27 in the direction Y.

Thus the translatory movements $Y_\alpha$ and $Z_\alpha$ are functions of the angle $\alpha$ and, when this latter continuously varies, are functions of time. The distance $Z_0$ is a programmable and adjustable parameter of the device, given by the distance between the axis 28 of mechanical rotation and the axis A of oscillation effectively obtained. It can be fixed or variable as a function of time. The position of the axis A of oscillation is programmed in the embodiment shown in FIGS. 1 and 2 on the center of the piece 20 to be sawed, which in this case is cylindrical. One will thus have a constant distance $Z_0$. FIG. 2 shows the position of the different components of the sawing device in three different positions, in which the position of the point or axis of oscillation A remains unchanged, by carrying out vertical movement $Z_\alpha$.

On the other hand, this position of the axis A of oscillation could also be programmed so as to be located on the wire layer 15 or at a predetermined distance from the layer of wires, the distance $Z_0$ will thus decrease continuously as a function of time and as of the progress of cutting.

Figure 4:
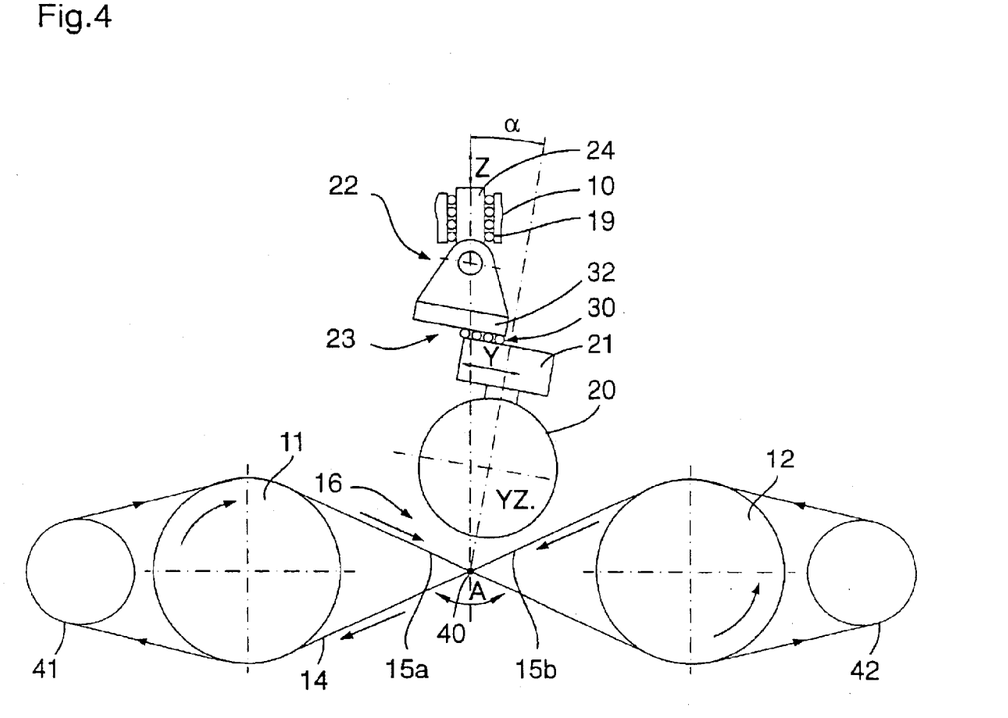
FIG. 4 is a schematic side view of a modification of the first embodiment.

In the modification of the first embodiment shown in FIG. 4, all the assembly of mechanical elements is identical to the first embodiment, if the sawing device, instead of having one layer of parallel wires, comprises two layers of crossing wires 15a and 15b. The wire is wound in crossed manner about wire guide cylinders 11, 12 and thus forms between these two wire guide cylinders two layers 15a and 15b which cross along a straight line 40. The sawing device also comprises two external wire guide cylinders 41, 42 required for parallelism of the wires of the two crossed layers 15a and 15b. The control device 22 and the oscillation device 23 can thus be programmed such that the axis A of oscillation coincides with the straight line 40 of crossing of the layers 15a and 15b. There is thus obtained a particularly precise and rapid cutting.

Figure 5:
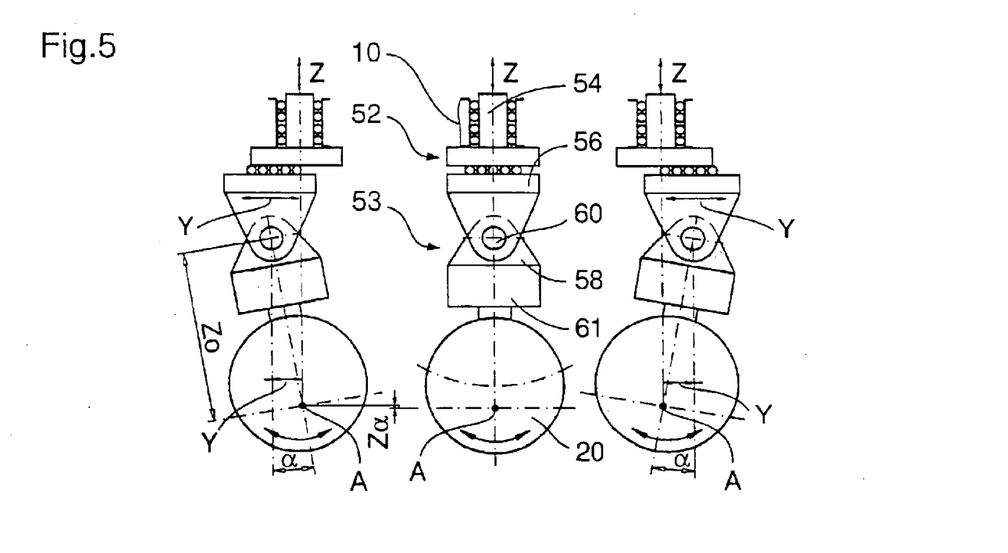
FIG. 5 shows a second embodiment in three different positions.
Figure 6:
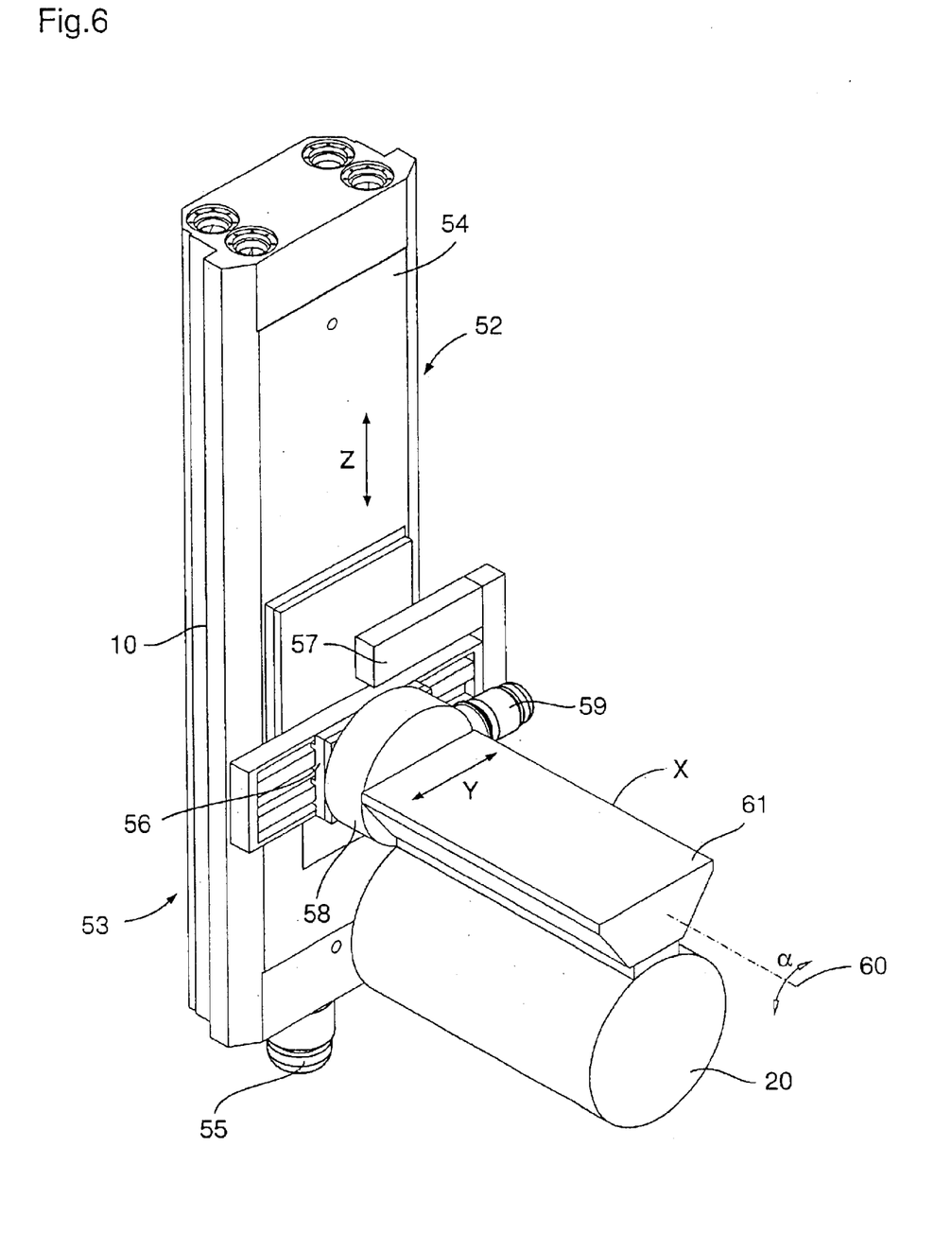
FIG. 6 is a perspective view of a mechanical embodiment of this second embodiment.

The second embodiment shown in FIGS. 5 and 6 has a different mechanical construction of the control device 52 for the movements of the piece 20 to be sawed and of the oscillation device 53. This latter also comprises a slide 54 mounted movably on the frame 10 in a direction Z and driven by a motor 55. A table 56 with transverse movement is mounted on the slide 54 and can be moved by means of a motor 57 in a Y direction perpendicular to the cutting direction Z and parallel to the wires of the layer of wires. This table 56 carries a rotatable plate mechanism 58 driven by a motor 59 to carry out an angular movement a about an axis 60 of rotation parallel to a direction X and perpendicular to the directions Y and Z.

The rotatable plate 58 is secured to the support table 61 on which is fixed the piece 20 to be sawed. The motors 55, 57 and 59 are controlled by a control unit. The oscillatory movement of the piece to be sawed is also obtained by two translatory movements in directions Y and Z and a rotation $\alpha$ about the axis 60. For oscillation through an angle $\alpha$ about the axis A of oscillation, the following mathematical relations exist between $\alpha$, $Z_\alpha$ and $Y_\alpha$:

$$Z_\alpha = Z_0(1-\cos \alpha)$$

$$Y_\alpha = Z_0 \cdot \sin \alpha$$

in which $Z_0$ is equal to the distance separating the axis 60 of rotation and the axis A of oscillation;

$Z_\alpha$ corresponds to the movement of the slide 54 relative to the frame 10 in the direction Z;

$Y_\alpha$ corresponds to the movement of the table 56 of the support table 61 and of the rotatable plate 58 relative to the slide 54 in the Y direction.

FIG. 5 shows the position of the different components of the sawing device in three different positions, in which the position of the point or axis A of oscillation remains unchanged, by carrying out movement $Z_\alpha$.

Thus this second embodiment permits obtaining movements of oscillation of the piece 20 to be sawed about an axis A of oscillation whose position can be programmed, adjusted and predetermined in a way identical to the first embodiment and in a way such that the axis A of oscillation is located at a programmable and adjustable distance Z from the effective axis 60 of rotation. Obviously, this oscillation device 53 could be used with layers of wire of any nature, single or crossed, like the first embodiment and its modification.

Figure 7:
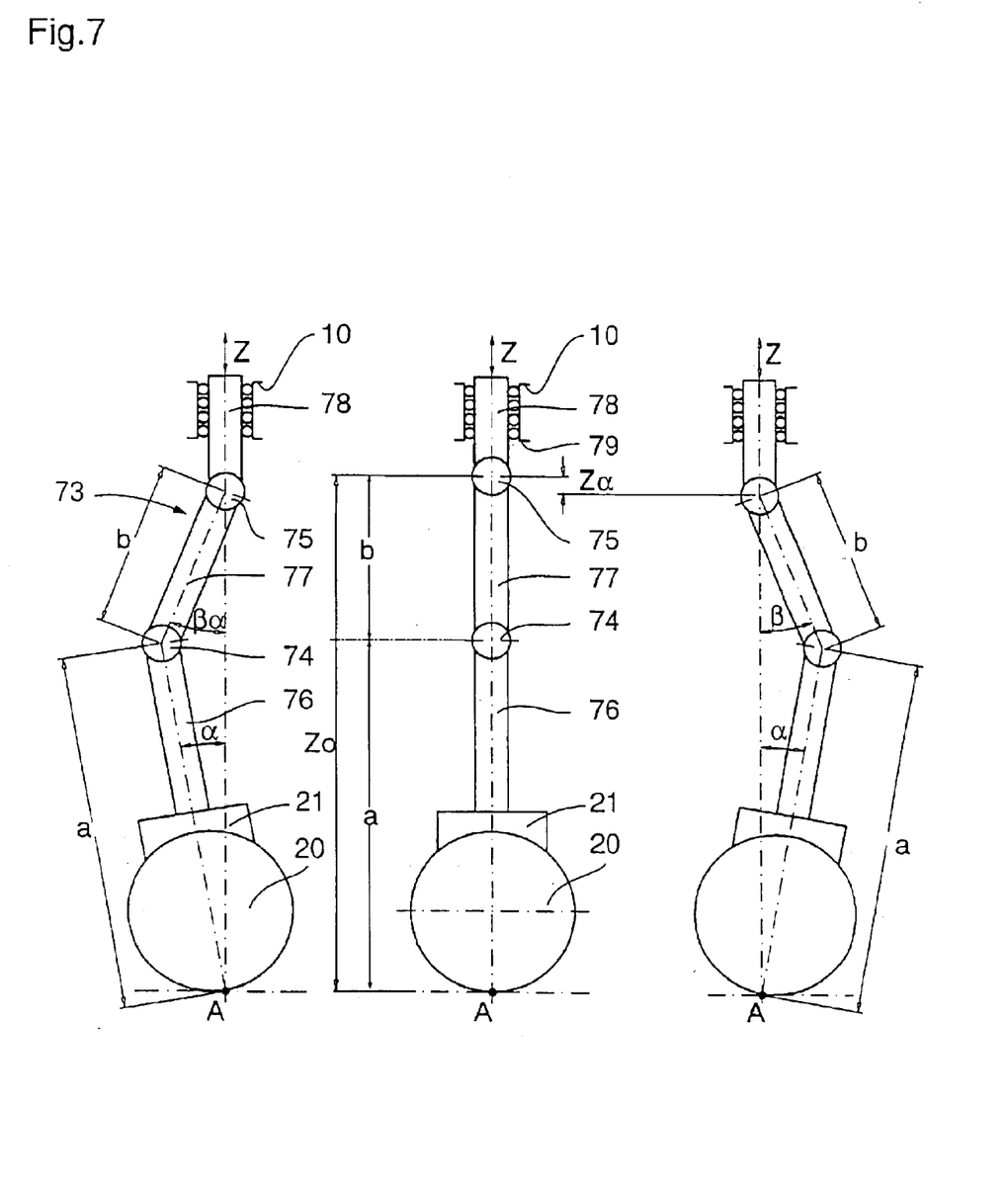
FIGS. 7 and 8 show a third and fourth embodiment in three different positions.

In the third embodiment shown in FIG. 7, the oscillation device 73, instead of providing two translations and one rotation, has two effective axes 74, 75 of rotation and translation in the cutting direction Z. Thus, the piece 20 to be sawed is mounted on a support table 21 which is secured to a first oscillating member or lever 76 pivotally mounted about a first axis 74 of rotation on a second oscillating member or lever 77 mounted pivotably about a second axis 75 of rotation on a slide 78 arranged movably in the cutting direction Z on the stationary frame 10. Thanks to the slide 78 and its two oscillating arms 76, 77 which can be driven by motors (not shown) controlled by a control unit, it is possible to produce an oscillatory movement of the piece about an oscillation axis A whose spatial position can be adjusted and programmed such that this oscillation axis A is located at any time at a programmable and adjustable distance from the second axis 75 of rotation or from a reference point on the frame 10, such as the lower limit 79 of the guide path of the slide 78.

If an oscillation of the piece to be sawed is produced about an angle $\alpha$ about the stationary axis A of oscillation relative to the frame 10, then the movements of the pieces should be produced according to the following laws:

$$Z_\alpha = Z_0 - (a \cdot \cos \alpha + b \cdot \cos \beta)$$

$$a \cdot \sin \alpha = b \cdot \sin \beta$$

wherein a and b are the lengths of the two levers 76 and 77, a corresponds in fact to the programmable distance between the axis 74 of rotation and the axis A of oscillation 74;

$Z_0$ corresponds to the sum of the lengths a+b;

$Z_\alpha$ is the movement to be produced by the slide 78; and

B corresponds to the rotation of the lever 77 about the axis 75 of rotation.

Thus, when the second lever 77 turns in a given direction by an angle $\beta$ about the axis 75 of rotation, the first lever 76 turns in the opposite direction by an angle $\alpha+\beta$ about the axis 74 of rotation and the slide 78 moves downwardly a distance $Z_\alpha$ such that the axis A of oscillation remains stationary. In this embodiment, the distance b is fixed and given by the mechanical construction of the oscillation device 73. On the other hand, the distance a is a programmable parameter and its magnitude depends on the desired position of the axis A of oscillation.

Figure 8:
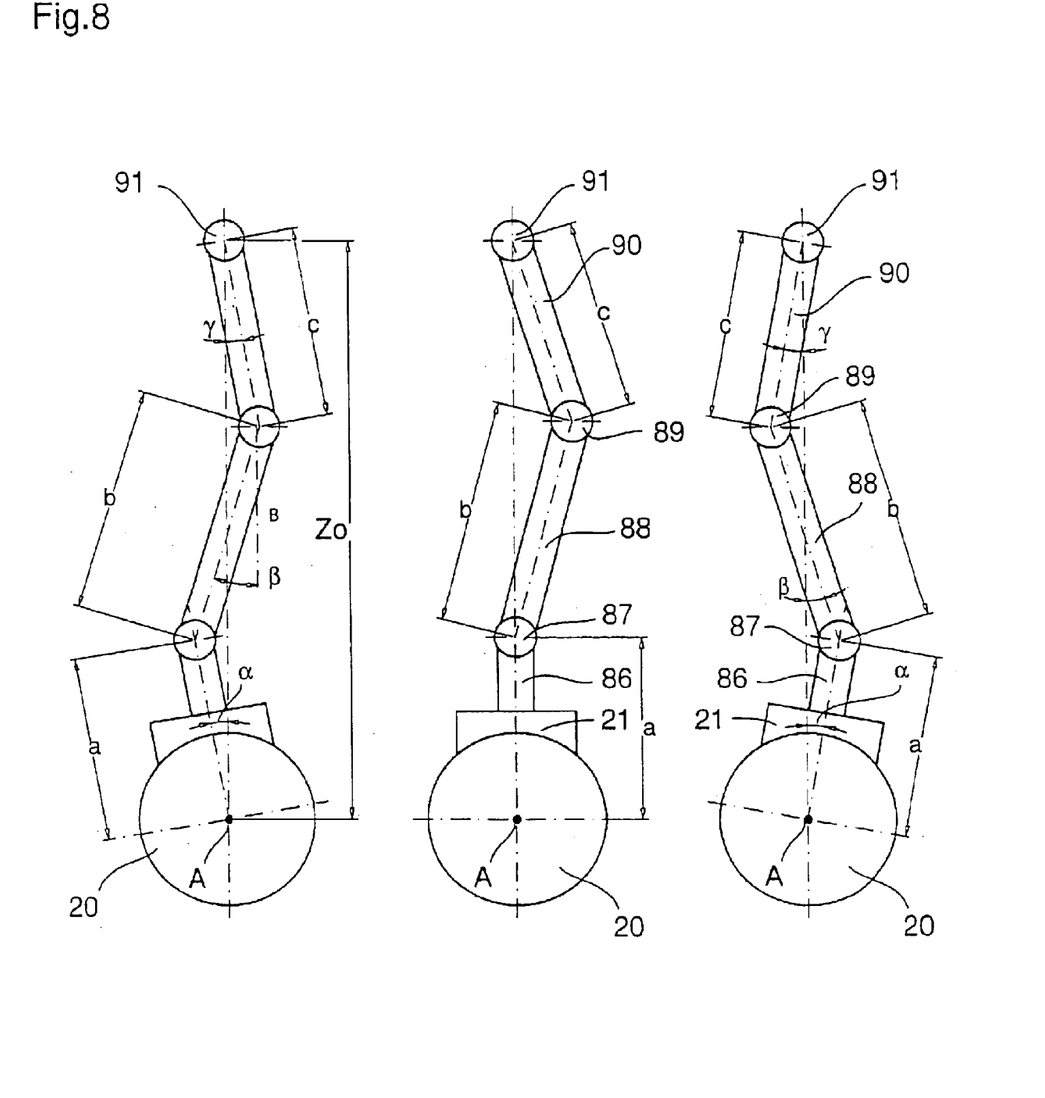

The fourth embodiment shown in FIG. 8 shows another possibility of embodying the invention by using three rotations which correctly combined permit the rotation $\alpha$ about an axis A of oscillation located at a predetermined programmable and adjustable spatial position from a reference point on the frame. Thus, the piece 20 to be sawed is mounted on a support table 21 secured to a first lever 86 pivotally mounted about a first axis of rotation 87 on a second lever 88 which is pivotally mounted about a second axis of rotation 89 on a third lever 90 and this latter pivots about a third axis 91 of rotation fixed relative to the frame of the sawing device.

Thus, if it is desired to produce a rotation of the piece to be sawed through an angle α about the axis A of rotation whose position must be stationary relative to the frame, there should be produced rotations of the levers 86, 88 and 90 obeying the following laws:

$$Z_0 = a \cdot \cos \alpha + b \cdot \cos \beta + c \cdot \cos \gamma$$

wherein $Z_0$ is equal to the programmed distance separating the third axis 91 of rotation from the axis A of oscillation, a, b and c being the lengths of the levers 86, 88 and 90; in fact a corresponds to the programmable distance between the axis 87 of rotation and the axis A of oscillation; α, β and γ corresponding to the angles of rotation which the lever 86, 88 and 90 occupy relative to the vertical in FIG. 8.

In the four embodiments described above, the oscillation device is mounted on the mechanism for advancing the support table of the piece to be sawed. This is not the case in the fifth embodiment shown in FIGS. 9 and 10. This latter comprises a layer 100 of wires supported by wire guide cylinders 101, 102 mounted on an oscillation device 103. This device 103 has a swinging frame 104 pivotally mounted on the frame 105 of the sawing device by a pivot 110 whose axis of rotation is perpendicular to the cutting plane YZ. The two wire guide cylinders 101, 102 are each mounted rotatably on a support piece 106, 107 and these support pieces, fixed together by connection bars 108, are arranged on roller bearings 109 movably in a direction Y on the frame 104 of the oscillation device.

Figure 9:
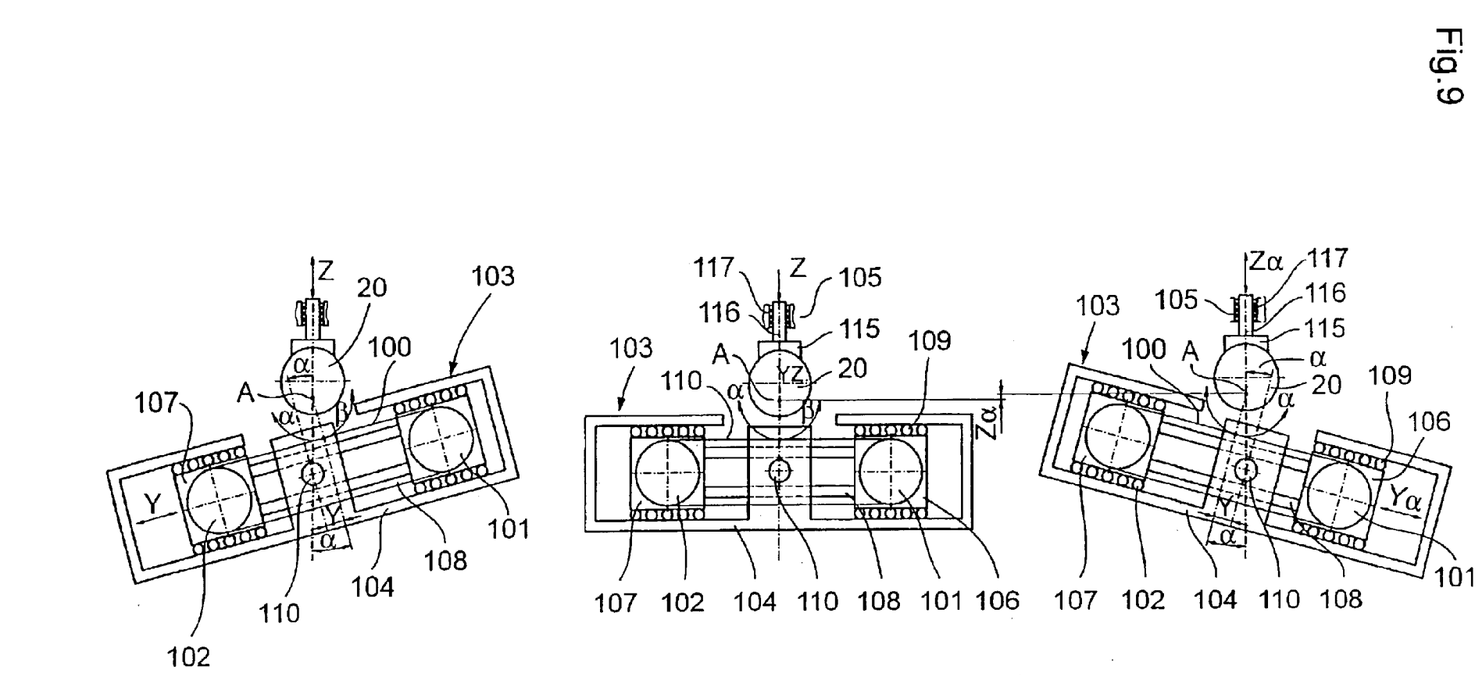
FIG. 9 shows a fifth embodiment in three positions.
Figure 10:
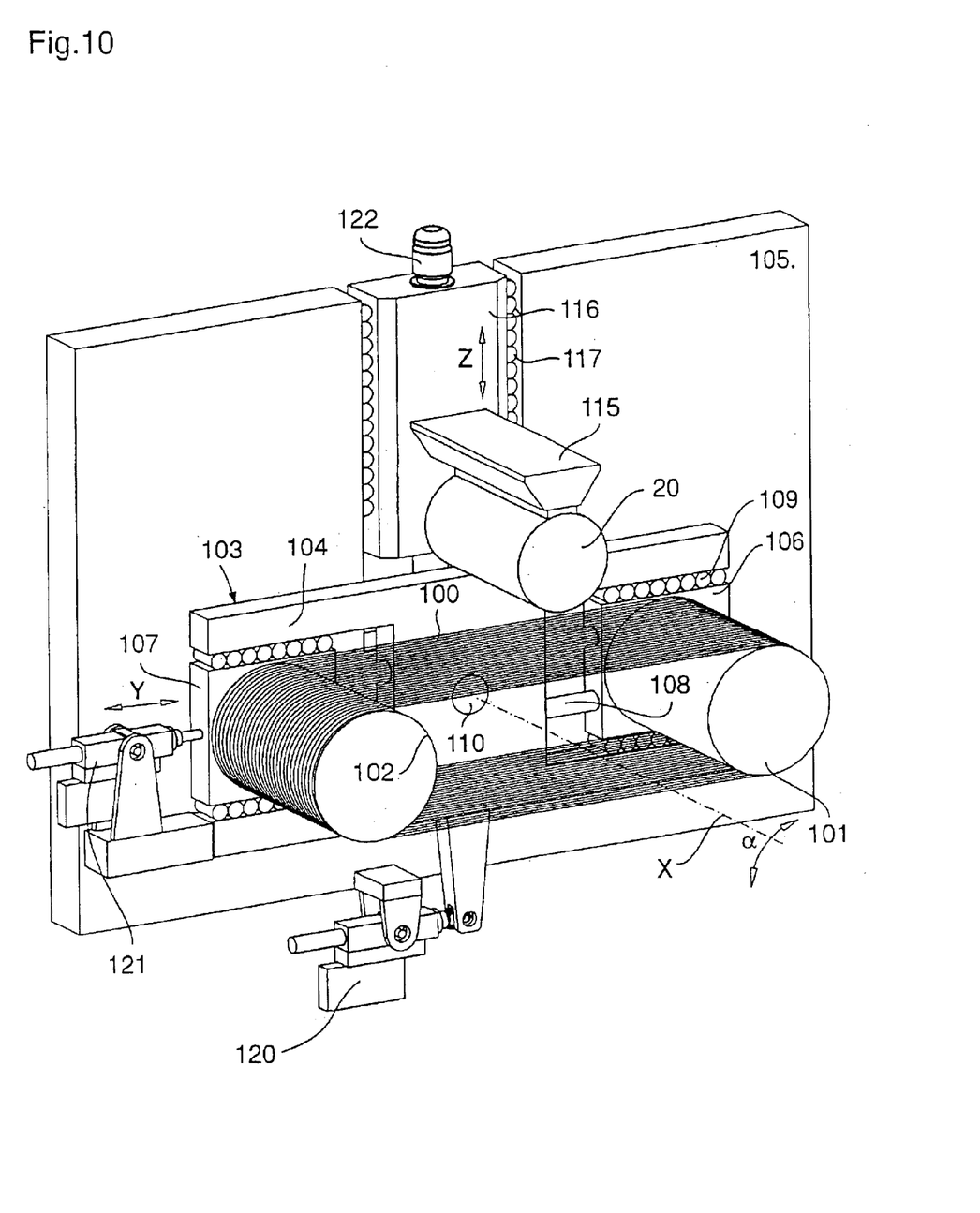
FIG. 10 is a perspective view of a mechanical embodiment of this fifth embodiment.

The piece 20 to be sawed is fixed on a support table 115 secured to a slide 116 arranged movably in a cutting direction Z on the frame 105 by means of roller bearings 117. The movement of rotation of the frame 104 about the pivot 110 is controlled by a power driven jack 120. The translation of the wire guide cylinders 101, 102 in the Y direction is obtained by means of a power driven jack 121 and the translation of the piece 20 to be sawed in the cutting direction Z is produced by a motor 122. The jacks 120, 121 and the motor 122 are controlled by a control unit which can be programmed such that the combination of translations in Y and Z and the rotation about pivot 110 produce an oscillatory movement about an axis A of oscillation whose spatial position is programmable and adjustable.

In this embodiment, the oscillation device 103 is mounted on the mechanism supporting the wire guide cylinders. The corrective translations in the direction Z are carried out by the slide 116 supporting the piece to be sawed. These translations could of course also be associated with the mechanism supporting the wire guide cylinders 101, 102.

The object of the invention thus consists generally in permitting the sawing device to vary the angle which the piece 20 to be sawed makes relative to the layer or layer of wires 15 in the course of sawing, by impressing on the piece to be sawed or on the layer of wires a balancing or oscillatory movement parallel to the layer of wires about any fixed or variable point A, selected according to the needs of the process. To do this, there are produced for example two movements in the directions Z and Y and a rotation α. The three movements are independent and can be carried out independently of each other or have a movement interconnected by a function which determines the selected point or axis A of oscillation. This oscillatory movement permits decreasing the engaged length of the wire in the course of sawing as well as improving the penetration of the abrasive.

The rate of renewal of the abrasive along the sawing path by the oscillatory movement of the piece to be sawed relative to the layer of wires thus increases, accompanied by an increase in the efficiency of sawing. The successive passages of the surface already sawed of the slice, due to oscillations of the piece, will have a lapping effect on the surface of the slice, hence they decrease the undulations and the roughness of the surface. The choice of the position of the axis A of oscillation will be for example at the center of the piece to be sawed or at the point of contact of the piece to be sawed and the layer of wires. In this latter case it will be necessary to program it as a function of the relative position of the support table 21 and the layer of wires. To carry out this function, it could be done for example electronically from a digital control by introducing into the latter the coordinates as a function of time or of the relative position of the support table. Each of these movements, namely the rotation or rotations and the translations, could be independently activated but could be connected by a mathematical function depending on the selected point or axis A of oscillation. Moreover, the frequency and amplitude of rotation about the selected axis could be variable as a function of the relative position of the table or of the cutting advance.

The precision of the pieces to be sawed, which is very important for semiconductor applications, depends on the position of the wire in the course of sawing, as well as on the surface condition (undulations and roughness). This surface condition, if it is not controlled, can impair the entire sawing technique. This latter thus requires moreover a universal oscillation device which permits minimizing these defects in the course of sawing, because even small variations will result in slices that are unacceptable for subsequent procedures.

The requirements of the electronic applications, for example connected to increasing size of pieces to be sawed, require that even the smallest variations must be avoided. It thus no longer suffices to saw the slices continuously, but rather to superpose in the course of sawing an operation of lapping and rectification arising from oscillations of the piece to be sawed about a predetermined point that is variable or not with moreover better control of the penetration of the abrasive along the sawing path. The frequency of this movement as well as its amplitude can be predetermined in the course of sawing and will thus be a function of the shape of the piece to be sawed. This manner of sawing moreover has the advantage of having a clearing effect on the wire, thereby improving its sawing efficiency.

The sawing device with the control device 22 thus permits superposition on the advancing movement Z, of a programmed oscillatory movement and thus comprises an assembly permitting causing oscillation about any point A, defined by the application, with an amplitude and frequency that varies in the course of sawing. This mechanical assembly can be controlled by an electronic, digital or other system. The use of this device permits producing pieces of increased precision.

Of course the embodiments described above are in no way limiting and they can be the subject of any desirable modification within the scope defined by claim 1. In particular, the sawing device could comprise a number of wire guide cylinders greater than two. The control of the translatory and rotation movements could be obtained by any electrical, electromagnetic, pneumatic, hydraulic means or any other actuators. The oscillatory movement, its amplitude and frequency, could be subject to devices for measuring the surface condition of the slices. The sawing device and the oscillation device could have any other mechanical construction. Thus, the oscillatory devices of the first, second, third and fourth embodiments could also be used to produce a movement of oscillation of the layer of wires, whilst the piece to be sawed remains motionless. In a complex modification, the piece to be sawed and the layer of wires could be simultaneously or alternately subject to oscillatory movements about axes of oscillation whose spatial position is programmable.

What is claimed is:

1. Wire sawing device comprising:
   at least one layer of wires (15) movable with alternating or continuous movement;
   wire guide cylinders (11, 12) supporting and pressing the layer of wires against a piece (20) to be sawed;
   an advancing means (19) providing a relative advancing movement between piece (20) to be sawed and the layer of wires (15) in a cutting direction (Z) contained in a cutting plane (YZ);
   an oscillatory means (23) providing a relative oscillatory movement between the piece (20) to be sawed and the layer of wires (15) about an axis of oscillation perpendicular to the cutting plane,
   the oscillatory means comprising an oscillation device (23) having at least one effective axis (28) of rotation and movable members (24, 30) arranged so as to produce a relative movement of oscillation between the piece (20) to be sawed and the layer of wires (15) about an axis (A) of oscillation with a spatial position that can be adjusted and programmed such that the axis (A) of oscillation is located at a programmable and adjustable distance (Z) from the effective axis (28) of rotation; and
   at least one support table (21) on which the piece (20) to be sawed is fixed,
   the oscillation device (23) arranged to act on the support table (21),
   the oscillation device (23) comprising at least a first rotatable member (27) to carry out a rotation ($\alpha$) about the effective axis (28) of rotation perpendicular to the cutting plane (YZ),
   the movable members of the oscillatory means comprising a second member (30), carrying out a movement in a direction parallel to the cutting plane (YZ), and a third member (24) carrying out a translatory movement in a direction coinciding with the cutting direction (Z),
   the rotatable element (27) mounted on the third member (24), and
   the second member (30) having a sliding element (31, 32) disposed between the rotatable element (27) and the support table (21) on which the piece (20) to be sawed is fixed.

2. Sawing device according to claim 1, characterized by the fact that the movements of the first, second and third members (27, 30, 24) are connected by the following equations:

$$Z_\alpha = \left(\frac{Z_0(1-\cos a)}{\cos a}\right)$$

$$Y_\alpha = Z_0 \cdot tg\alpha$$

in which $Z_0$ is equal to the distance separating the axis (28) of rotation of the rotatable element (27) from the axis (A) of oscillation that is obtained;

$\alpha$ is the angle of rotation of the rotatable element (27);
$Z_\alpha$ corresponds to the translatory movement of the third member (24); and $Y_\alpha$ corresponds to the translatory movement of the second member (30).

3. Sawing device according to claim 1, further comprising:
   a programmable control unit (35) adapted to control the movements of rotation and translation produced by the oscillatory device such that the combination of these generated movements has as its resultant an oscillatory movement about an axis (A) of oscillation whose position is adapted to be programmed.

4. Sawing device according to claim 3, wherein, the programmable control unit (35) is arranged so as to produce an oscillatory movement which can have variable amplitudes and frequencies within the course of time and/or as a function of the sawing depth.

5. Wire sawing device comprising:
   at least one layer of wires movable with alternating or continuous movement;
   wire guide cylinders supporting and pressing the layer of wires against a piece to be sawed;
   an advancing means providing a relative advancing movement between the piece to be sawed and the layer of wires in a cutting direction (Z) contained in a cutting plane (YZ);
   an oscillatory means providing a relative oscillatory movement between the piece to be sawed and the layer of wires about an axis of oscillation perpendicular to the cutting plane,
   the oscillatory means comprising an oscillation device having at least one effective axis of rotation and movable members arranged so as to produce a relative movement of oscillation between the piece to be sawed and the layer of wires about an axis (A) of oscillation with a spatial position that can be adjusted and programmed such that the axis (A) of oscillation is located at a programmable and adjustable distance (Z) from the effective axis of rotation; and
   at least one support table on which the piece to be sawed is fixed,
   the oscillation device arranged to act on the support table,
   the oscillation device comprising a first rotatable member to carry out a rotation ($\alpha$) about the effective axis of rotation perpendicular to the cutting plane (YZ),
   the movable members of the oscillatory means comprising a second member, carrying out a movement in a direction parallel to the cutting plane (YZ), and a third member carrying out a translatory movement in a direction coinciding with the cutting direction (Z),
   the second member has a sliding element (56) disposed between the third member (54) and the first member (58),
   the first member forming a rotatable element fixed on the support table (61) on which the piece (20) to be sawed is fixed, the rotatable element being mounted on the sliding element (56).

6. Sawing device according to claim 5, characterized by the fact that the movements of the first, second and third members are connected by the following equations:

$$Z_\alpha = Z_0(1-\cos \alpha)$$

$$Y_\alpha = Z_0 \cdot \sin \alpha$$

in which $Z_0$ is equal to the distance separating the axis of rotation of the rotatable element and the obtained axis (A) of oscillation;

α is the angle of rotation of the rotatable element;

$Z_\alpha$ corresponds to the translatory movement of the third member;

$Y_\alpha$ corresponds to the translatory movement of the second member.

7. Sawing device according to claim 5, further comprising:

a programmable control unit (35) adapted to control the movements of rotation and translation produced by the oscillatory device such that the combination of these generated movements has as its resultant an oscillatory movement about an axis (A) of oscillation whose position is adapted to be programmed.

8. Sawing device according to claim 7, wherein, the programmable control unit (35) is arranged so as to produce an oscillatory movement which can have variable amplitudes and frequencies within the course of time and/or as a function of the sawing depth.

* * * * *